United States Patent [19]

Luckevich

[11] Patent Number: 5,691,900
[45] Date of Patent: Nov. 25, 1997

[54] METHOD AND SYSTEM FOR TURNING DETECTION

[75] Inventor: Mark Luckevich, Ann Arbor, Mich.

[73] Assignee: Kelsey-Hayes Company, Livonia, Mich.

[21] Appl. No.: 497,409

[22] Filed: Jun. 30, 1995

Related U.S. Application Data

[63] Continuation-in-part of Ser. No. 282,520, Jul. 28, 1994, abandoned.

[51] Int. Cl.$^6$ ................................................ B60K 41/00
[52] U.S. Cl. ............................. 364/424.051; 364/426.06
[58] Field of Search ..................... 364/424.05, 426.02, 364/426.01, 424.051, 424.016; 180/197; 303/96, 94

[56] References Cited

U.S. PATENT DOCUMENTS

| | | | |
|---|---|---|---|
| 4,036,536 | 7/1977 | Quon | 303/96 |
| 4,761,022 | 8/1988 | Ohashi et al. | 280/772 |
| 4,876,650 | 10/1989 | Kubo | 364/426.02 |
| 5,124,921 | 6/1992 | Jonner et al. | 364/426.01 |
| 5,140,524 | 8/1992 | Matsuda | 364/426.02 |
| 5,168,955 | 12/1992 | Naito | 180/197 |
| 5,172,318 | 12/1992 | Meissner et al. | 364/426.02 |
| 5,255,193 | 10/1993 | Katayose et al. | 364/426.02 |
| 5,275,474 | 1/1994 | Chin et al. | 303/94 |
| 5,282,674 | 2/1994 | Matsuda | 303/9.71 |

FOREIGN PATENT DOCUMENTS

WO94/06657  3/1994  WIPO.

*Primary Examiner*—Kevin J. Teska
*Assistant Examiner*—Stephen J. Walder, Jr.
*Attorney, Agent, or Firm*—Brooks & Kushman P.C.

[57] ABSTRACT

A method and system, for use with a vehicle including a pair of front wheels, a pair of rear wheels, and an anti-lock brake system (ABS), for detecting when the vehicle is executing a turning maneuver. The system includes means for performing the method steps of determining a speed difference between one pair of the vehicle wheels, determining the deceleration of each of the one pair of vehicle wheels, comparing the speed difference to a turning detection threshold, comparing the decelerations to a deceleration threshold, and detecting a turning maneuver based on those comparisons.

34 Claims, 6 Drawing Sheets

METHOD AND SYSTEM FOR TURNING DETECTION

CROSS REFERENCE TO RELATED APPLICATION

This is a continuation-in-part of U.S. patent application Ser. No. 08/282,520 filed on Jul. 28, 1994 entitled Method And System For Turning Detection now abandoned.

TECHNICAL FIELD

The present invention relates to a method and system for detecting when a vehicle is turning for purposes of vehicular antilock brake system control.

BACKGROUND ART

Vehicle manufacturers are increasingly including antilock braking systems (ABS) on vehicles. These systems are designed to increase the ability of a vehicle operator to bring a vehicle to a stop on road surfaces, even if the surfaces are slippery, by controlling the relative slip between the vehicle wheels and the road surface.

When a vehicle is travelling on a road surface, it is possible that the coefficient of friction, also known as mu or $\mu$, is different between the two sides of the vehicle. That is, considering the longitudinal axis of the vehicle, the two wheels on the left side of the vehicle are on one type of surface (e.g. ice), and the other two wheels are on a different type of surface (e.g. packed snow).

In this situation, the optimum brake torque which can be applied to the tires on the left side of the vehicle without forcing them to lock is different from the brake torque that can be applied to the tires on the right side of the vehicle, assuming the vehicle is travelling straight on the road surface. This type of brake pressure (or torque) control is known as yaw control. If the pressure on both sides was to be controlled equally, a yaw moment would be induced from the unequal brake force distribution induced by the split in surface frictions. The yaw moment will create vehicle instability and possibly induce a spin if adequate steering correction is not performed. To prevent the vehicle from spinning, the pressure rise amplitude on the higher friction surface is limited, based on what is happening on the lower friction surface.

Once the pressure has been isolated and vehicle braking is being controlled, the brake pressure is thereafter controlled based on the identified split $\mu$ condition. As such, for the lower friction surface, the wheels will be cycled in ABS as it normally would, whereas for the higher friction surface, a method of pressure apply is established so as to both maintain vehicle stability and optimize vehicle stopping distance.

The problem is encountered, however, when a vehicle is turned, or cornered. In this situation, there is a transfer of weight and a shift of the center of gravity, such that one side of the vehicle becomes weighted while the other side becomes unweighted. In considering a cornering vehicle, it is the inside wheels that become unweighted, with the outside wheels becoming weighted. If an ABS event (i.e. activation of ABS control) occurs during a turn, the ABS will react in a similar fashion as to the split $\mu$ condition described above. The unweighted wheel will be considered to be travelling on a lower coefficient of friction in the tire-road contact because it is unweighted. As such, it will depart sooner, imitating a lower friction surface. The weighted tires, to the contrary, will require much more pressure to force those wheels to depart, or transition from a stable condition toward instability or a locking condition.

The problem occurs in that the mechanism for split $\mu$ control is activated during a turning maneuver although the optimum control mechanism for a true split $\mu$ condition is not optimum for braking a vehicle while it is cornering. Accordingly, it is desirable to be able to differentiate between a true split $\mu$ condition (e.g. one occurring due to differences in road adhesion along the longitudinal axis of the vehicle) and the other case in which the vehicle is on a road surface with a homogenous $\mu$ but the vehicle is in a maneuver resulting in an imbalance of the weight distribution. The present invention provides the tool for such a differentiation.

DISCLOSURE OF THE INVENTION

It is, therefore, an object of the present invention to provide a method and system for differentiating between road condition split $\mu$ and a vehicle maneuvering (i.e., turning) split $\mu$ condition.

In carrying out the above object and other objects and features of the present invention, a method is provided, for use with a vehicle including a pair of front wheels, a pair of rear wheels, and an anti-lock brake system, for detecting when the vehicle is executing a turning maneuver. The method comprises determining a speed difference between one pair of the vehicle wheels, and determining the deceleration of each of the one pair of vehicle wheels. The method also comprises comparing the speed difference to a first threshold, comparing the decelerations to a deceleration threshold, and detecting the execution of a turning maneuver based on those comparisons.

In an alternative embodiment, the method comprises determining a speed difference between one pair of the vehicle wheels, and determining an estimated lateral acceleration of the vehicle based on the speed difference between one pair of the vehicle wheels. The alternative method further comprises comparing the estimated lateral acceleration to a turning detection threshold, and detecting a turning maneuver based on the comparison of the estimated lateral acceleration to the turning detection threshold.

Systems for carrying out these methods are also provided.

The advantages accruing to the present invention are numerous. For example, the methodology of the present invention results in the differentiation of split $\mu$ conditions due to road surface variations, and a vehicle maneuvering (i.e., turning) split $\mu$ condition.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

According to the present invention, the onset of a vehicle maneuver is detected and the yaw control mechanism may be either overridden, or in some cases, utilized but with a different pressure control scheme. In this situation, the unweighted wheel will depart sooner (it will dump pressure), and then cycle normally. Initially, the weighted wheel will not depart in unison with the unweighted wheel, and as a result will have pressure built on it at an increased pressure apply rate. The pressure applied to the apparent high μ wheel or weighted wheel is adjusted by increasing the pulse widths of the pressure apply pulses or by reducing the spacing between the pulses, or by a combination of the two methods. The increase in the pressure apply rate is based on the detection of the turning maneuver.

When the vehicle is in a cornering maneuver, there if often an asymmetry in the configuration of the vehicle due to at least in part an unequal loading of the wheels and suspension. If ABS is activated by braking the vehicle in the cornering maneuver, there can be a difference in the left and right brake pressure captured when the ABS system isolates the brakes (from the master cylinder). The difference in brake pressure is caused by the asymmetric loading of the vehicle which will influence the activation of the ABS system. The activation is typically based on wheel slip and deceleration which will not be equal in a turning maneuver. The isolation of the unweighted wheel forces the subsequent isolation of the weighted wheel (which is a typical occurrence in split mu conditions) at a brake pressure that is below the optimum pressure for the prevailing conditions. Therefore, according to the present invention, isolation of the high mu front wheel is delayed by, for example, 10 mS. This will result in a higher pressure at the weighted (high mu) wheel when it is isolated. So, if the turning detection mechanism of the present invention has indicated the vehicle is in a cornering maneuver, it will delay the isolation of the weighted wheel and allow the pressure to build to a higher absolute pressure before it isolates.

It should be appreciated that at the onset of ABS, a certain level of slip and wheel deceleration is generally required. For purposes of this discussion, slip is defined by comparing a reference wheel speed to the actual wheel speed. Once there is a difference—that the actual wheel speed becomes less than the reference speed—there is slip. If the vehicle is travelling on a homogenous surface, the wheels frequently will not necessarily depart simultaneously, and if the turning detection mechanism is active during this initial phase of ABS, a false turning maneuver may be indicated because of this difference in wheel speeds, when the difference in wheel speeds is actually being generated by slip caused by braking and not by a turning maneuver.

Figure 1:
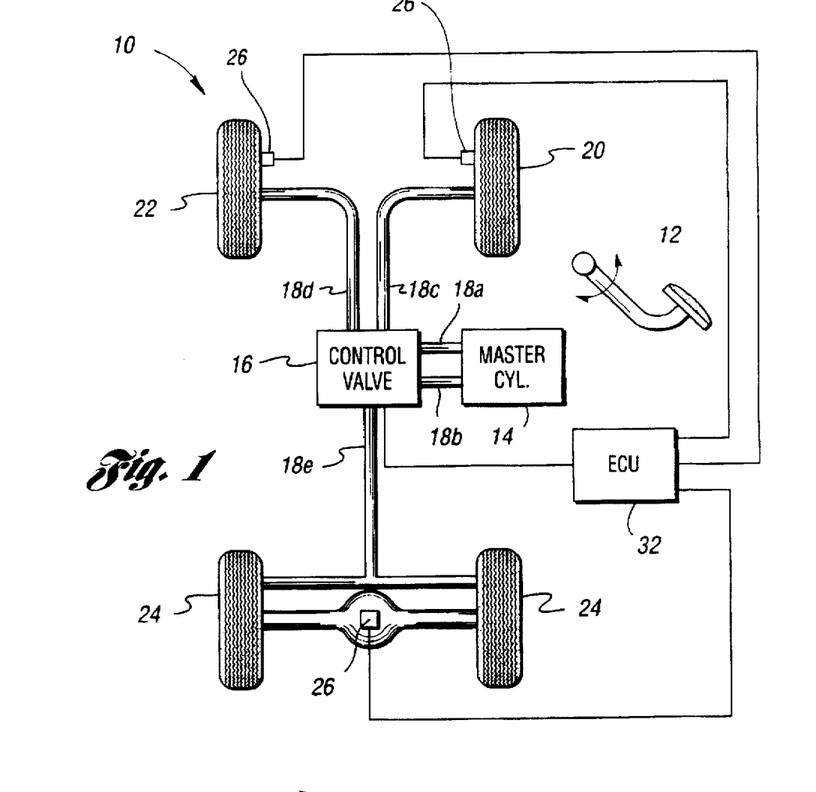
FIG. 1 is a schematic illustration of an antilock brake system (ABS) for use with the present invention.

Referring now to FIG. 1, there is shown a schematic diagram of the antilock brake system (ABS) for use with the present invention, designated generally by reference numeral 10. Although the system shown is generally referred to as a vertical split system, it should be understood that the present invention is equally applicable to other known system configurations, such as a diagonal system. The ABS 10 includes a brake pedal 12, a master brake cylinder 14, a control valve 16, brake fluid conduits 18a, 18b, 18c, 18d and 18e. As shown, the ABS is utilized in conjunction with a vehicle having front wheels 20, 22 and a pair of rear wheels 24.

As illustrated, the control system 10 of the present invention includes three vehicle wheel speed sensors, shown generally by reference numeral 26, which function to measure the velocity of each of the front wheels 20, 22, and the rear wheels 24. It should be understood that the present invention is not limited to a particular number of sensors. It should be appreciated that the configuration of sensors shown is commonly used on rear wheel drive vehicles. The present invention is also useful on vehicles which utilize four (4) sensors—one associated with each wheel—although such an arrangement is not particularly shown. The control system also includes an ABS electronic control unit (ECU) 32. Each of the wheel sensors 26, as well as other well-known sensors not specifically illustrated for the sake of clarity, are in electrical communication with the ECU 32. As is well-known in the art, each of the wheel speed sensors 26 may comprise a stationary variable reluctance sensor positioned adjacent a toothed wheel (not specifically illustrated) which rotates with its respective vehicle wheel 20, 22, and 24. The variable reluctance sensors each generate a pulsed signal whose frequency varies directly with the speed of the wheels. Each of these signals is communicated to the ECU 32 by the wheel sensors 26 for use in accordance with the present invention, as described in greater detail below. Of course, other well-known wheel speed sensor configurations may also be employed.

The ECU 32, in turn, is itself in electrical communication with the ABS control valve 16. Although interconnections have been described as being electrical, it should be appreciated that other forms of connection, such as fiber optics, are possible.

For purposes of this discussion, the ECU 32 includes electronic componentry and executes software, permitting the ECU 32 to control the ABS according to the algorithm of the present invention. In the preferred embodiment, the ECU 32 includes a commercially available microprocessor. In general, the ECU 32 operates to determine control objectives, to activate the apply or dump valves, to control pressure or to hold pressure at its current level. For example, the ECU 32 functions as control means for determining a slip threshold, and control means for determining a departure depth. The ECU also functions as control means for comparing the departure depth to the slip threshold and actuating the control valve when the departure depth exceeds the slip threshold. This action isolates the individual vehicle wheel brakes in the hydraulic brake circuit from the master cylinder, thereby halting any increase in brake fluid pressure in the vehicle wheel brakes and preventing incipient vehicle wheel lock.

To activate the antilock brake system, the ECU 32 is operatively connected to the ABS control valve 16, which provides for regulation of the brake fluid pressure from the master brake cylinder 14 to the individual brakes (not specifically illustrated) of each of the wheels 20, 22, 24 via the brake fluid conduits 18a, 18b, 18c, 18d, and 18e.

The control system 10 of the present invention has been described and shown herein for use with an ordinary passenger vehicle ABS. However, it should be readily appreciated that the control method and system 10 of the present invention are suitable for use in any vehicles wherein an ABS may be required. For example, the present invention has applicability to independent rear control on medium duty trucks.

Figure 2:
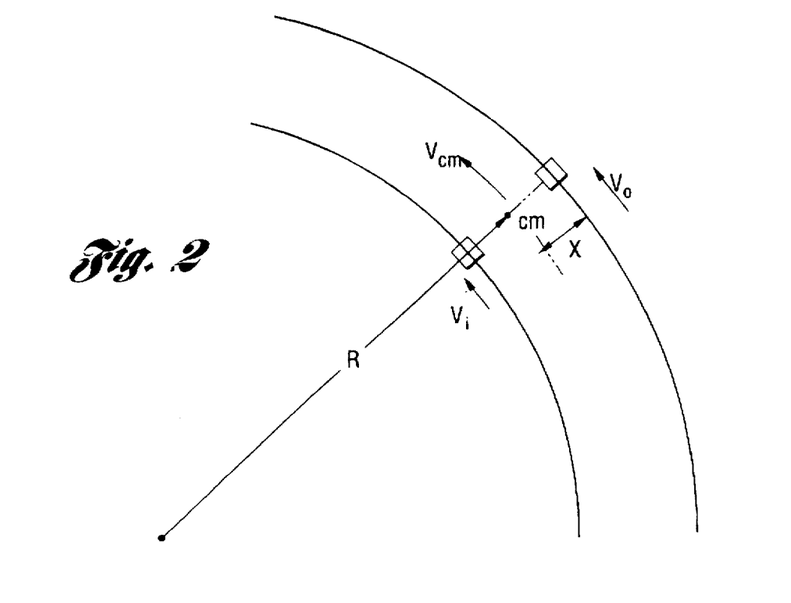
FIG. 2 is a simplified diagram depicting a vehicle turning maneuver to which the method and system of the present invention are directed.

Referring now to FIG. 2, there is shown a diagram of a single axle vehicle model which illustrates a derivation for use with the present invention for detecting whether the vehicle is turning. When a car is following a specific radius, the outside wheel is turning at a different speed than the inside wheel. This fundamental difference can be utilized to detect the fact that the vehicle is turning.

For a vehicle following a track of a fixed radius, the velocity of the center of mass ($V_{cm}$) of the vehicle can be approximated by $V=2\pi R/t$. The velocity of the outside wheel can also be determined with $2\pi R/t$, but now the radius is the distance to the center mass (R) plus the distance between the center of the mass (cm) and the outside wheel (X). For the inside wheel, the radius utilized for velocity calculations is the distance to the center of mass less the distance from the center of mass to the inside wheel. The distance X is thus proportional to half the track width of the vehicle. It should be appreciated that the wheel velocities that are determined from the wheel speed sensor are not angular velocities, which are also associated with the wheels.

Accordingly, the velocities of the outside and inside wheels, $V_o$ and $V_i$, respectively, become:

$$V_o = \frac{2\Pi}{t} *(R+X) = V_{cm}* \left(1+\frac{X}{R}\right) \quad (1)$$

$$V_i = \frac{2\Pi}{t} *(R-X) = V_{cm}* \left(1-\frac{X}{R}\right)$$

After substituting $V_{cm}$ in these equations for $2\pi R/T$, the equations can be solved independent of vehicle speed. Factor K is the difference between $V_o$ and $V_i$ normalized to the vehicle speed $V_{cm}$, the speed of the center of mass:

$$K = \frac{V_o - V_i}{V_{cm}} = \frac{\frac{2\Pi R}{T}\left[\left(1+\frac{X}{R}\right)-\left(1-\frac{X}{R}\right)\right]}{\frac{2\Pi R}{T}} \quad (2)$$

Addition, subtraction, and cancellation yields:

$$K = \frac{2X}{R} \quad (3)$$

Thus, although the difference in speed between the outside and inside wheels (K) changes with vehicle speed, the relationship is independent of speed. Rather, it is a function of the radius of curvature.

In the preferred embodiment, this K factor is utilized to establish a threshold. Generally, the difference in wheel velocities is determined and compared to the threshold. If the difference exceeds that threshold, the vehicle will be considered to be in a turning maneuver. Since the track width of a vehicle varies from vehicle to vehicle, the actual value of the threshold also varies. The value of the threshold can vary based on other factors, such as tire radius. In one embodiment, mismatched tire radii are detected and compensated for by offsetting the threshold by a value which is proportional to the detected difference. In the preferred embodiment, however, corrected wheel speeds are utilized, obviating the need for adjustments to the threshold.

There are boundaries to consider in determining a value for the threshold. The first boundary is the maximum wheel speed difference and is established by turning the steering wheel to the full stop position and accelerating the vehicle in a circle to the point of instability. The difference in wheel speeds is then measured and, given this difference in wheel speed for this vehicle speed, this is the maximum threshold at which a turning maneuver will be detected. For the other boundary, the focus is on the smallest turn possible, which can be accomplished at basically the maximum speed of the vehicle. In the preferred embodiment, the threshold should be selected so as to be less than the maximum threshold, but not so small as to give false indications of turning or influence pressure control on a gradual high speed turn where there is little weight transfer. If the vehicle is travelling at a high speed on a very wide turn, accurate detection of a turning maneuver is not as critical because it is quite likely that there is not enough weight transfer to activate the yaw control. So the worst case is where the vehicle is negotiating a tight corner and at a speed resulting in significant weight shift, such as 40-50 mph. The general concern is to detect turning maneuvers (e.g. set a turn flag) in situations in which yaw control would activate and give an undesirable pressure control profile because the vehicle is not on a split μ surface; rather, the vehicle is on a homogeneous surface and it is the weight transfer that is providing the difference in coefficients of friction.

Figure 3:
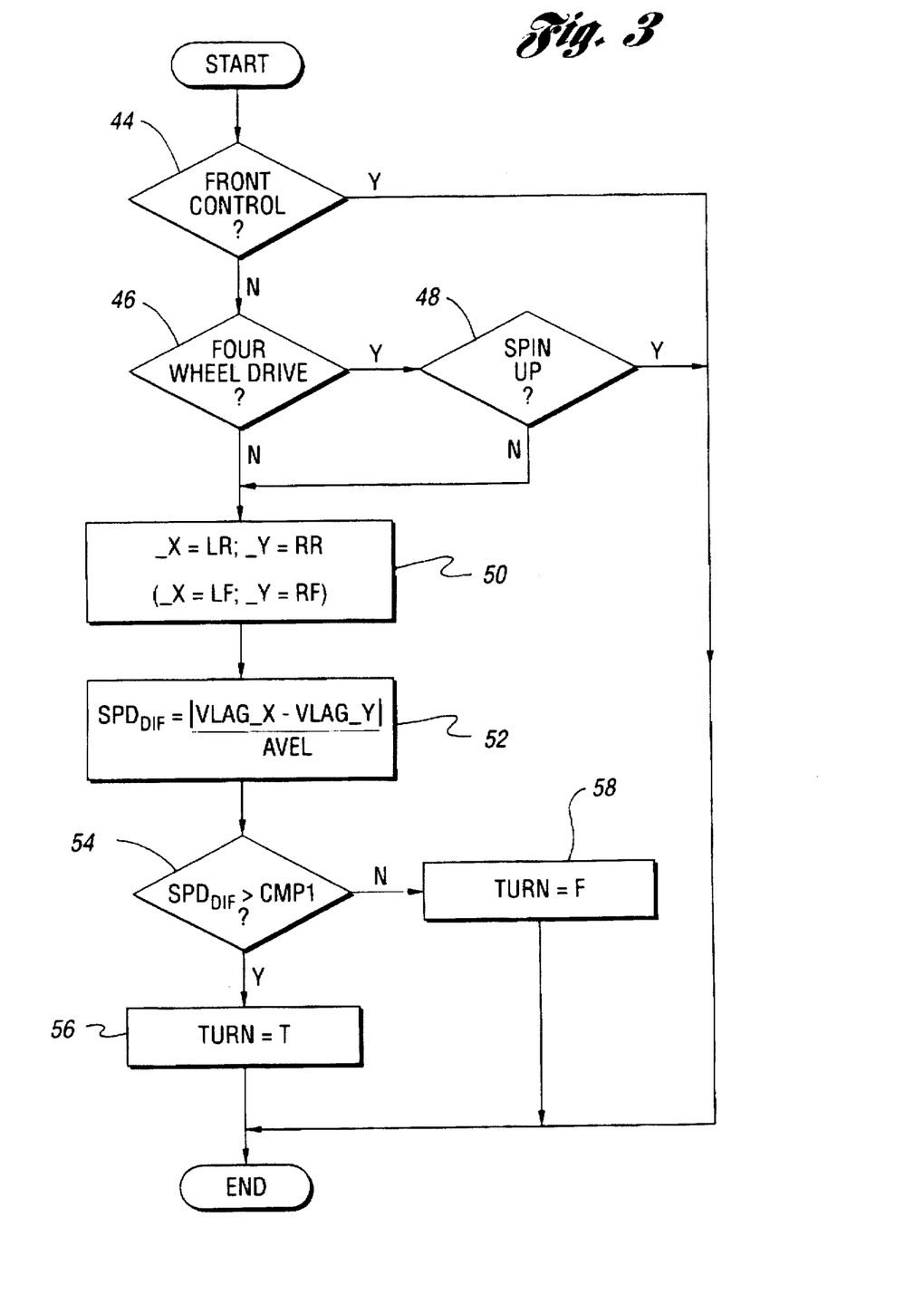
FIG. 3 is a flowchart detailing the methodology for turning detection according to one embodiment of the present invention.

Referring now to FIG. 3, there is shown a flowchart detailing the steps for turning detecting according to the present invention. The turning detection mechanism utilizes filtered wheel speeds. As such, there is some time delay between the actual wheel speed and the value utilized by the microprocessor in the ECU 32. We have a frequency-to-digital converter that outputs edges which are counted and from which the raw wheel speed is determined. That raw wheel speed is then low-pass filtered prior to being used.

With continuing reference to FIG. 3, the onset of an ABS event also results in the bypass of the turning detection mechanism. A situation may exist wherein there is a wheel that is at a lower speed than its counterpart on the opposite side of the vehicle, the difference in speed resulting not from a turn, but from braking torque. In the preferred embodiment, there is a flag (CNTRL) the state of which is indicative of an isolation of pressure from the brakes. At step 44, the state of the front CNTRL flag is checked.

If the vehicle is into a situation that may or may not warrant activation of the ABS, the ABS will often temporarily isolate a channel from the master cylinder to prevent the further build-up of pressure. The front control flag is preferably checked since on most vehicles, the front wheels will approach instability first and, accordingly, the ABS will activate on the front wheels before the rear wheels. This is referred to as being "front skid limited". If the front control flag indicates the onset of an ABS event (i.e. left front or right front channel isolation), the turning detection mechanism is bypassed. If the CNTRL flag is true (or false) at that point it will stay true (or false) for the remainder of actions occurring due to that isolation. Thus, the detection mechanism only functions outside of an ABS event. Once you establish either the onset or the activation of an ABS event, the mechanism is latched, and the ABS will be controlled based on the latching of that mechanism.

It should be noted that according to the present invention, it is the wheel speeds of the undriven wheels that are used for comparison purposes. In other words, on a front wheel drive vehicle, the rear wheel speeds are utilized, whereas the front wheel speeds are selected for a rear wheel drive vehicle. Typically, four wheel drive vehicles are rear wheel drive vehicles. In that case, the undriven wheels (i.e. the front wheels) are used when the vehicle is in two-wheel drive mode. If, however, the four wheel drive vehicle is a full-time four wheel drive (also called all-wheel drive) vehicle, or if it is a four wheel drive vehicle in which there is an indication when the driver engages the four wheel drive (e.g. a microprocessor input), the rear wheels will be used. Selecting the rear wheels in these vehicles reduces the effect of error associated with utilizing the front wheels in certain situations, such as in an understeer condition. If the vehicle utilizes only one rear sensor (as is common with rear wheel drive vehicle, and as shown in FIG. 1) then the front sensors are preferably used at all times regardless of the status of 4WD.

Accordingly, at step 46, the ECU 32 determines whether the four wheel drive is engaged. If the condition is true, at step 48 the ECU 32 checks for the presence of a spin up. For purposes of this discussion, a spin up condition exists when the accelerator is depressed and one or both of the driven wheels start spinning at a speed which exceeds that of the vehicle, whether the vehicle is negotiating a cornering maneuver or going straight. The speed difference, however, may be a very small speed which nevertheless results in an indication of a turn. Accordingly, the speeds of the undriven wheels are utilized, since the speed of the undriven wheels represents vehicle speed and any differences in the wheel speeds will be indicative of a turn, rather than a power induced or torque induced difference. In the case of engaged four wheel drive (or true all wheel drive), spin up exists if the actual wheel speeds of all four wheels exceed the reference speed (recalling that if wheel speeds are below the reference speed, slip exists) by a threshold amount or for a certain length of time. In other words, the speeds can exceed the reference by some amount or for some period of time without indicating a spin-up condition. In the preferred embodiment, if such a condition exists in four wheel drive, the turning detection is bypassed, as shown at step 48 (in all other cases undriven wheel speeds are utilized).

As shown in FIG. 3, at step 50 the ECU 32 selects the undriven wheels, either the rear wheel speeds (_X=LR; _Y=RR) for a front wheel drive vehicle, or the front wheel speeds (_X=LF; _Y=RF) for a rear wheel drive vehicle. At step 52, the calculation is performed as follows:

$$A = |VLAG\_X - VLAG\_Y| \quad (4)$$

The difference in wheel speeds is also normalized to the estimated average speed of the vehicle center of mass, denoted in FIG. 3 as AVEL, which is calculated from the averaging of references. The normalized difference is also scaled at step 52. In the preferred embodiment, the scaling factor is 256 counts per mile per hour. The normalized difference is in miles per hour, and the use of the scaling factor provides for an absolute difference independent of speed. Table I and the sample calculation below illustrate the relationship between the average vehicle speed (AVEL), the normalized wheel speed difference ($SPD_{DIF}$), and the effect of the scaling factor.

TABLE I

| AVEL | $SPD_{DIF}$ |
|---|---|
| 5 | .39 |
| 25 | 1.95 |
| 50 | 3.90 |
| 75 | 5.86 |

The table of numbers was obtained assuming a particular threshold CMP1 value of 20 at various average vehicle speeds (5, 25, 50, and 75). Utilizing Equation 4:

$$20 * AVEL = |VLAG\_X - VLAG\_Y| \quad (5)$$

Substituting 5 mph in for AVEL, and scaling the result, the difference in wheel speeds ($SPD_{DIF}$) becomes:

$$\frac{100}{256} = VLAG\_X - VLAG\_Y = .3906 \quad (6)$$

Figure 4:
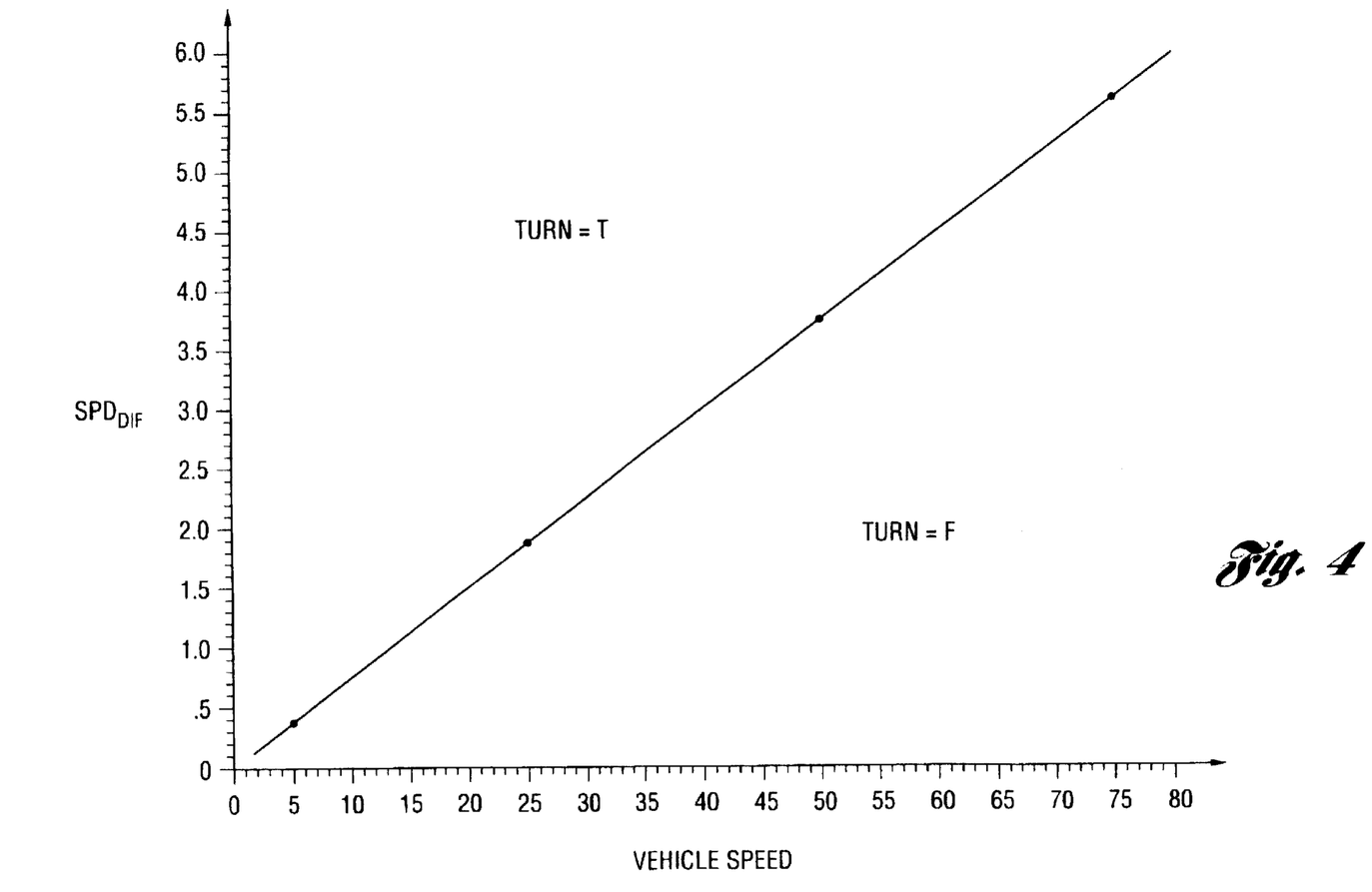
FIG. 4 is a graph illustrating the relationship between the average vehicle speed and the normalized wheel speed difference necessary for determining a vehicle turning maneuver according to one embodiment of the present invention.

Thus, if the vehicle is traveling at a speed of 5 miles per hour and the difference in the undriven wheel speeds exceeds 0.3906, the turn flag is set, indicating a turning maneuver. As the table indicates, as vehicle speed increases, a greater difference in wheel speeds is required to set the flag. The data points of Table I are graphically illustrated in FIG. 4.

At step 54, the normalized difference in wheel speeds is then compared to CMP1, the threshold discussed in greater detail above. As shown in FIG. 3, if the normalized difference exceeds the threshold, a turn flag (TURN) is set at step 56, indicating the existence of a turning maneuver. If the normalized difference does not exceed the threshold, the flag is cleared at step 58.

Figure 5:
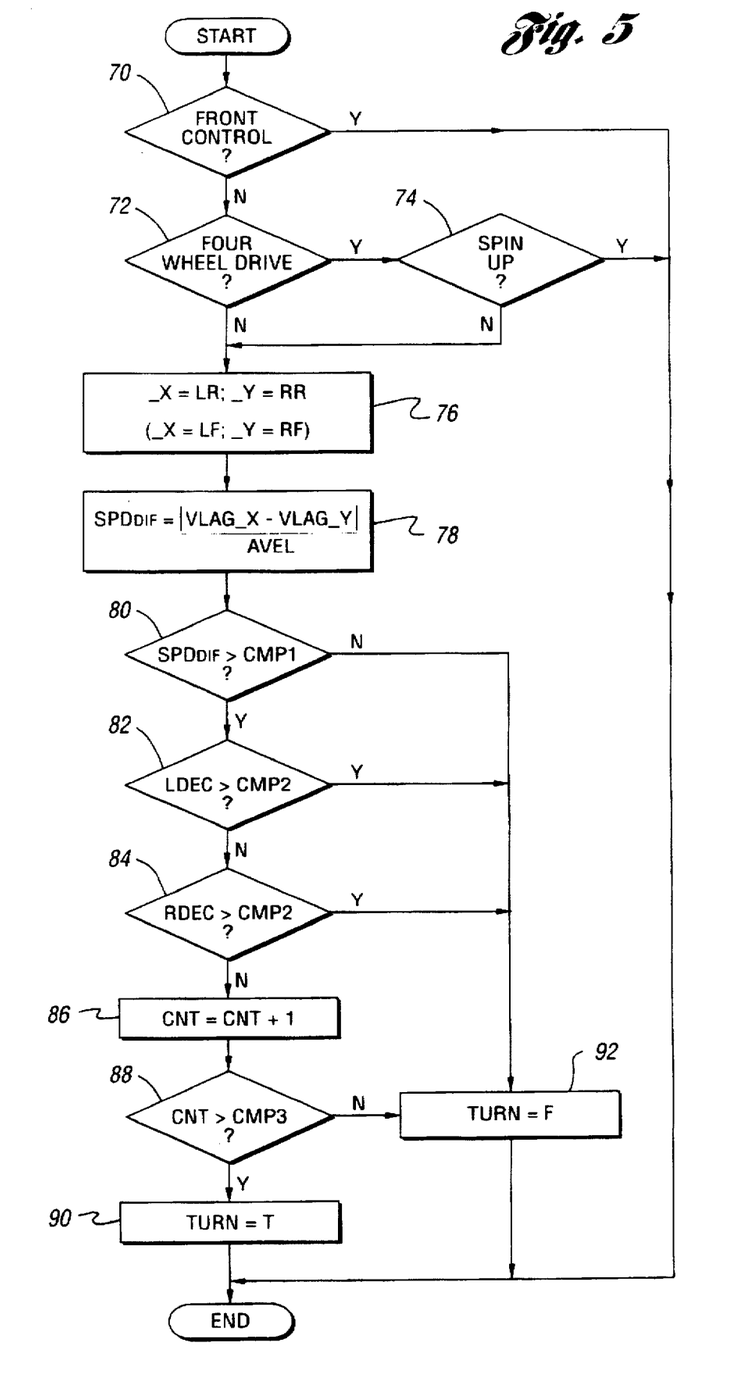
FIG. 5 is a flowchart detailing the methodology for turning detection according to a second embodiment of the present invention.

Referring now to FIG. 5, there is shown a flowchart detailing the steps for a modified turning detection strategy according to the present invention. More specifically, this strategy includes logic for a wheel deceleration based bypass and logic for hysteresis for setting the turn flag. The amount of hysteresis varies with different vehicle applications. Passenger cars, which have smaller tires with different rubber compounds than trucks, tend to require less hysteresis. It should be noted that steps 70-80 of FIG. 5 correspond to steps 44-54 shown in FIG. 3.

As shown in FIG. 5, at step 82 the ECU 32 compares the deceleration of the left undriven wheel (front or rear) with a threshold (CMP2). It should be appreciated that the raw wheel speeds are filtered and differentiated to obtain the decelerations. If the wheel is decelerating at a high rate, that indicates the onset of braking, an encounter with a pothole, or the like; but not an indication of a turning maneuver. In the preferred embodiment, the value of the threshold CMP2 is set so as to indicate an unstable condition in the wheel. A nominal threshold of 1G is representative of an unstable condition, since generally passenger cars and trucks can not decelerate more than 1G.

Essentially, if a wheel is decelerating anywhere between 0 and 1G, it may be decelerating with the vehicle, since generally vehicles are capable of decelerating in that range. However, if a wheel deceleration exceeds the 1G threshold, it is indicative of an unstable condition resulting from, for example, brake torque or an anomaly in the road surface, such as a railroad track, a pothole, or the like. It is desirable to bypass the turning detection mechanism when the wheel deceleration is too great.

Accordingly, a similar comparison of right wheel (front or rear) deceleration is made at step 84. If either of the comparisons at steps 82 and 84 are true, turning detection is bypassed, as shown. Of course, if the right conditions are present—vehicle type/characteristics, tire type, road surface types, temperature, and the like—the actual threshold value used may exceed (or be below) 1G.

With continuing reference to FIG. 5, at step 86 the ECU 32 increments the value of a counter (CNT). At step 88, the value of the counter is then compared to a third threshold (CMP3). The value of the CMP3 is set dependent upon the amount of hysteresis desired. If control flow reaches step 88, a turning maneuver has been detected. With the hysteresis, a delay period is introduced until the turn flag is set, so as to distinguish between speed difference due to a true turning maneuver or due to an anomaly in the road surface, for example. If the conditions indicative of a turn remain for the duration of the hysteresis—5 mS, 10 mS, 100 mS, etcetera, then the turn flag will be set to true at step 90. Thus, if CMP3 is set to a value of 5, and the loop time is 5 mS, there would be 25 mS of hysteresis. If the comparison at step 88 is not true, the turn flag is cleared at step 92. It should be appreciated that the deceleration and the hysteresis features described above at steps 82–92 do not necessarily have to be implemented together; it is possible to employ the deceleration comparison without the hysteresis, and vice versa.

According to yet another alternative embodiment of the present invention, utilization of turn information may be extended to improve rear slip control in a cornering maneuver. In that regard, modifications may be made to the calculations described above to provide additional and more accurate information.

More specifically, as described above, the determination of a vehicle turning maneuver is based on an estimate of the lateral acceleration of the vehicle. In the previously described embodiments of the present invention, vehicle lateral acceleration is never explicitly calculated and maintained, but remains a temporary variable used to set a turn flag when a threshold has been exceeded. In the alternative embodiment described here, however, similar calculations are used to maintain an estimate of vehicle lateral acceleration. This value is then used to manage the turn flag.

Figure 6:
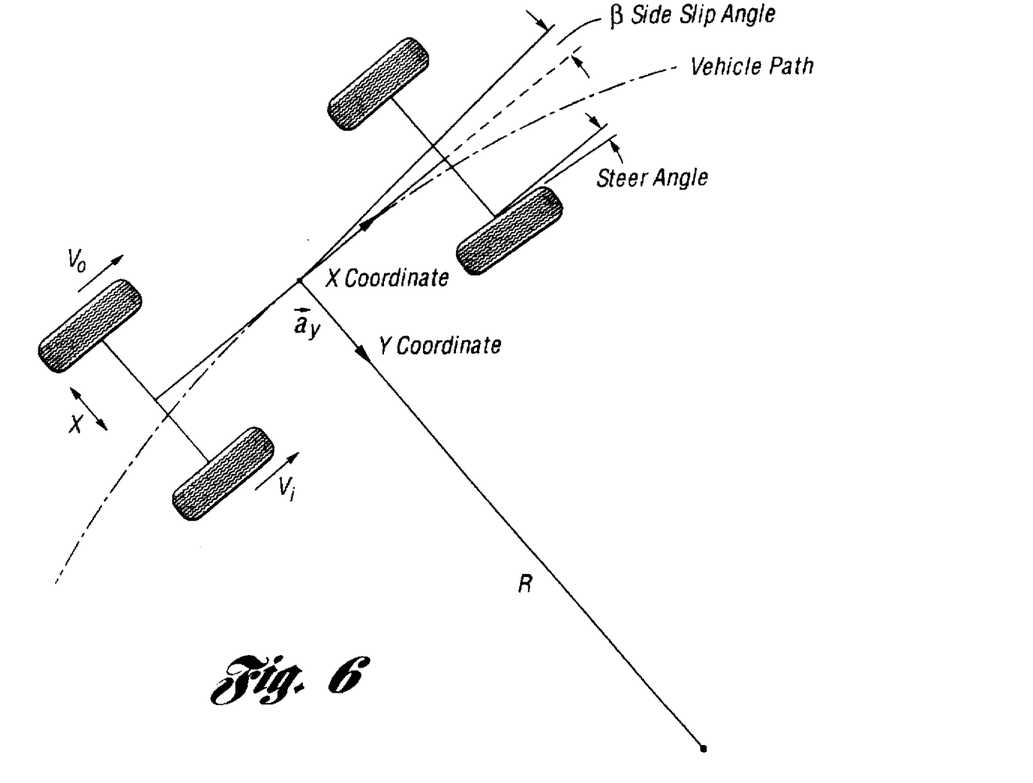
FIG. 6 is a simplified diagram depicting a another vehicle turning maneuver to which the method and system of the present invention are directed.

Referring now to FIG. 6, a simplified diagram depicting a vehicle turning maneuver is shown. As seen therein, in a steady state condition, vehicle lateral acceleration $(a_y)$ is equal to the product of the centripetal acceleration $(a_c)$ and the cosine of the vehicle's side slip angle (B), or:

$$a_y = a_c * \cos B \tag{7}$$

In most conditions, the side slip angle (B) is small. As a result, the lateral acceleration $(a_y)$ can be considered equal to the centripetal acceleration $(a_c)$. Since the centripetal acceleration $(a_c)$ is equal to the square of the vehicle velocity $(V^2)$ divided by the radius of the turn (R):

$$a_y = a_c = \frac{V^2}{R} \tag{8}$$

Thus, estimation of the lateral acceleration of the vehicle requires calculation of $(V_{cm})^2/R$, where $V_{cm}$ is the velocity of the center of mass of the vehicle and R is the radius of the turn. The vehicle velocity $(V_{cm})$ can be obtained from the estimated vehicle speed, while the turn radius (R) can be determined, in essence, from the difference between the undriven wheel speeds $(V_o$ and $V_i)$ during the turning maneuver.

More particularly, as in equation (1), the undriven wheel speeds are given by:

$$V_o = V_{cm} * \left(1 + \frac{X}{R}\right) \tag{1}$$

$$V_i = V_{cm} * \left(1 - \frac{X}{R}\right)$$

where X is one half of the vehicle track width. From this, it can be seen that the term $(V_o - V_i)$ becomes $V_{cm}*(2X/R)$. Since the vehicle half track width (X) is typically small compared to the radius of the vehicle turn (R), the turn radius (R) will dominate. It can therefore be seen that:

$$V_o - V_i \alpha \frac{1}{R} - \frac{V_{cm}}{R} \text{ for } R \gg X \tag{9}$$

As a result, it follows that:

$$a_y = \frac{V_{cm}^2}{\left(\frac{V_{cm}}{V_o - V_i}\right)} = V_{cm} * (V_o - V_i) \tag{10}$$

In this alternative embodiment of the present invention, equation 10 is used to estimate vehicle lateral acceleration $(a_y)$. For scaling reasons, an additional gain is applied. Moreover, the vehicle speed is limited to a maximum for noise reasons. Vehicle lateral acceleration $(a_y)$ may thus be expressed as follows:

$$a_y = G*V_{cm}*|V_o-V_i|, V_{cm}|_o^{V_{max}} \tag{11}$$

A similar method to those described above for previous embodiments of the present invention is used to set the turn flag, with the difference being that vehicle lateral acceleration $(a_y)$ must exceed a threshold (CMP1) to set the turn flag equal to true. In this embodiment, that threshold (CMP1) is preferably set at a level of 100.

Performing the same calculations as described above with the previous embodiments for speeds of 5, 25, 50 and 75 mph (with $V_{max}$ set at 60 mph) and where G=4, the following table results. It should again be noted that vehicle speed $(V_{cm})$ is represented by AVEL, and the wheel speed difference is represented by $SPD_{DIF}$:

TABLE II

| AVEL | $SPD_{DIF}$ |
|---|---|
| 5 | 5 |
| 25 | 1 |
| 50 | 0.5 |
| 75 (60) | 0.42 |

For example, where vehicle speed is 25 mph, wheel speed difference is 1 mph, and G=4, vehicle lateral acceleration $(a_y)$ would be determined as follows:

$$a_y = 4*25*1 \tag{12}$$
$$= 100$$

Figure 7:
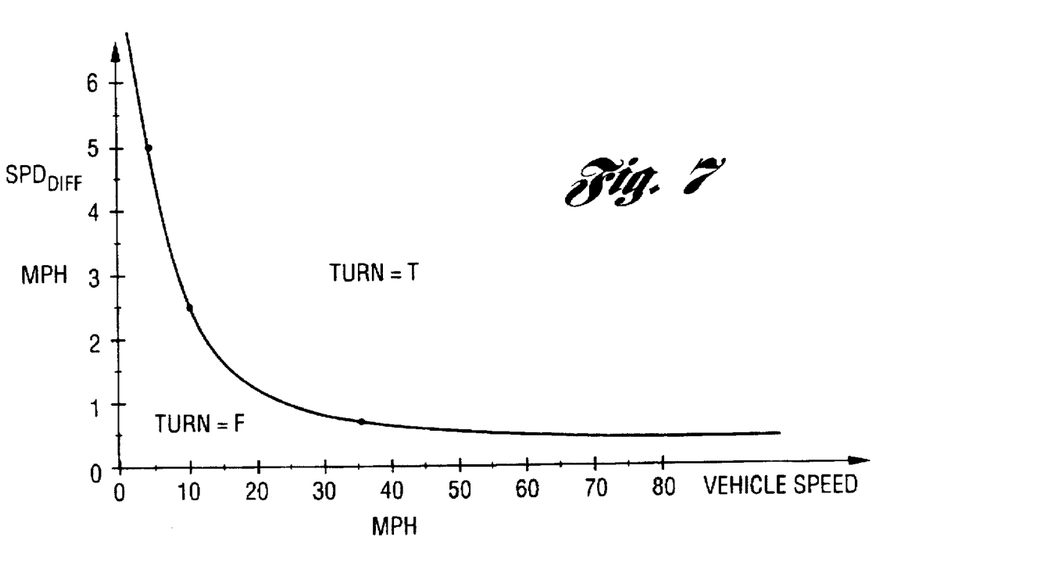
FIG. 7 is a graph illustrating the relationship between the average vehicle speed and the wheel speed difference necessary for determining a vehicle turning maneuver according to another embodiment of the present invention.

In this instance, vehicle lateral acceleration $(a_y)$ exceeds the threshold (CMP1=100) and the turn flag would be set true. In that regard, FIG. 7 illustrates the relationship between the vehicle speed and the wheel speed difference necessary for determining a vehicle turning maneuver (i.e., setting the turn flag true) according to this embodiment of the present invention.

Figure 8:
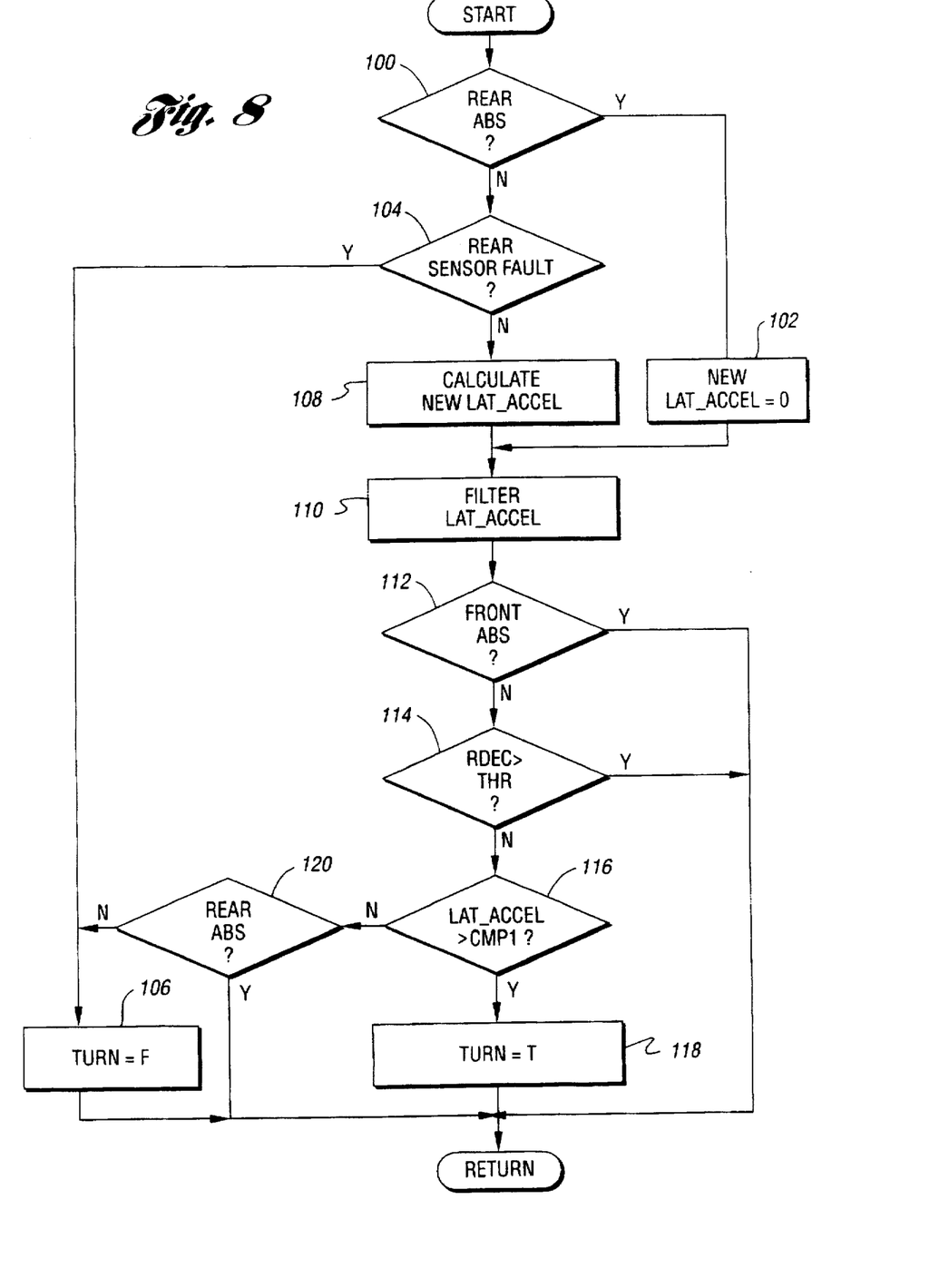
FIG. 8 is a flowchart detailing the methodology for turning detection according to a third embodiment of the present invention.

Referring next to FIG. 8, a flowchart detailing the methodology for turning detection according to this embodiment of the present invention is shown. This methodology replaces that shown in FIGS. 3 and 5 associated with the previously described embodiments of the present invention.

It should be noted that, unlike the previously described embodiments which are applicable in both rear wheel and four wheel drive vehicles, the embodiment described here is applicable only in front wheel drive vehicles. Moreover, in the previously described embodiments, vehicle lateral acceleration $(a_y)$ is not calculated under several conditions, such as when the front wheels are in ABS control.

In this embodiment of the present invention, however, that methodology has been modified such that lateral acceleration ($a_y$) is calculated even when the driven front wheels are in ABS control, since the undriven rear wheels may still be stable. In such instances, vehicle lateral acceleration ($a_y$) and the resultant turn information remain valuable.

However, even in this embodiment of the present invention, whether the driven front wheels are in ABS control is still used in the setting of the turn flag, as described in greater detail below. Moreover, in this embodiment, vehicle lateral acceleration ($a_y$) is not calculated where the undriven rear wheels are cycling in ABS control.

As seen in FIG. 8, in this embodiment of the present invention, the control method first checks whether the undriven rear wheels are cycling in ABS at decision block 100. If so, vehicle lateral acceleration (denoted in FIG. 8 as LAT_ACCEL) is set equal to zero at block 102. If not, however, the control method then checks whether the rear wheel speed sensor is faulty at decision block 104.

If at least one rear wheel speed sensor is faulty, the control method simply sets the turn flag false at block 106 and returns to start. However, if the rear wheel speed sensors are not faulty, the control method proceeds to calculate vehicle lateral acceleration, as described in detail above, at block 108.

After vehicle lateral acceleration has been calculated, or set equal to zero when the undriven rear wheels are cycling in ABS control, that lateral acceleration is then low-pass filtered at block 110 for noise reduction purposes. It should be noted that a zero input to such a filter will cause the filter output to decay to zero at a rate proportional to the time constant of the filter.

Thereafter, the control method checks whether the driven front wheels are in ABS control at decision block 112, and whether the deceleration of the rear wheels exceeds a selected threshold at decision block 114. These steps are the same as those of decision blocks 70 and 84, respectively, in FIG. 5. If either of those conditions exist, the control method again simply returns to start.

If, however, neither of those conditions are present, the control method proceeds to check at decision block 116 whether the filtered vehicle lateral acceleration exceeds its corresponding threshold, once again in a fashion as described in detail above. If so, the turn flag is set true at block 118 and the control method returns to start.

If the filtered vehicle lateral acceleration does not exceed its corresponding threshold, however, the control method then once more checks whether the undriven rear wheels are cycling in ABS at decision block 120. If so, the control method returns to start. As a result, this check is used to latch the turn flag true if it is already in that state when the rear wheels begin cycling in ABS control. If the rear wheels are not in ABS control, then the control method sets the turn flag false at block 106 and returns to start.

As previously stated, turn detection in this embodiment of the present invention is used for rear slip control. In that regard, if it is determined that the vehicle is executing a turning maneuver at low speed, then rear slip detection is modified to use the average of the rear wheel speeds (as opposed to the lower wheel speed typically used) in detecting rear wheel departures. In such a fashion, this embodiment of the present invention desensitizes the rear wheel ABS channels to slip, thereby improving rear braking efficiency.

According to the present invention, then, the onset of a vehicle turning maneuver is detected and the yaw control mechanism may be either overridden, or in some cases, utilized but with a different pressure control scheme such that the unweighted wheel will depart (it will dump pressure), and then cycle normally. The weighted wheel will not depart, and as a result will have pressure built on it at an increased pressure apply rate. The pressure applied to the brakes of the apparent high μ wheel or weighted wheel is adjusted by increasing the pulse widths of pressure apply pulses, or the pulse spacing, or both, based on the detection of the turning maneuver.

As previously stated, when the vehicle is in a cornering maneuver, there if often an asymmetry in the configuration of the vehicle due to at least in part an unequal loading of the wheels and suspension. If ABS is activated by braking the vehicle in the cornering maneuver, there can be a difference in the left and right brake pressure captured when the ABS system isolates the brakes (from the master cylinder). The difference in brake pressure is caused by the asymmetric loading of the vehicle which will influence the activation of the ABS system. The activation is typically based on wheel slip and deceleration which will not be equal in a turning maneuver. The isolation of the unweighted wheel forces the subsequent isolation of the weighted wheel (which is a typical occurrence in split mu conditions) at a brake pressure that is below the optimum pressure for the prevailing conditions. Therefore, according to the present invention, isolation of the high mu front wheel is delayed by, for example, 10 mS. This will result in a higher pressure at the weighted (high mu) wheel when it is isolated. So, if the turning detection mechanism of the present invention has indicated the vehicle is in a cornering maneuver, it will delay the isolation of the weighted wheel and allow the pressure to build to a higher absolute pressure before it isolates.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention as disclosed.

What is claimed is:

1. A method for use with a vehicle including a pair of front wheels, a pair of rear wheels, and an anti-lock brake system (ABS), the method for detecting when the vehicle is executing a turning maneuver, the method comprising:
   determining a speed difference between one pair of the vehicle wheels;
   determining the deceleration of each wheel of the one pair of vehicle wheels whose speed was utilized to determine the speed difference;
   comparing the speed difference to a turning detection threshold;
   comparing the decelerations to a deceleration threshold; and
   detecting a turning maneuver based on the comparison of the speed difference to the turning detection threshold and the decelerations to the deceleration threshold.

2. The method of claim 1 wherein detecting a turning maneuver based on the comparison of the speed difference to the turning detection threshold and the decelerations to the deceleration threshold includes setting a turn flag false if the deceleration of either wheel of the one pair of vehicle wheels whose speed was utilized to determine the speed difference exceeds the deceleration threshold.

3. The method of claim 1 wherein the speed difference is determined based on the speeds of the rear wheels when both pairs of the vehicle wheels are being driven, otherwise the speed difference being determined based on the speeds of the undriven pair of vehicle wheels.

4. The method of claim 1 wherein the speed difference is determined based on the speeds of the front wheels when both pairs of the vehicle wheels are being driven and the vehicle includes a single speed sensor associated with the pair of rear wheels.

5. The method of claim 1 further comprising:
modifying a counter after comparing the wheel decelerations to the deceleration threshold; and
comparing the value of the counter to a hysteresis threshold;
wherein detecting a turning maneuver is based on the comparison of the counter to the hysteresis threshold.

6. The method of claim 1 wherein the comparisons to each of the thresholds are made only if the ABS is not activated.

7. The method of claim 1 wherein the vehicle is travelling on a road surface having at least a low μ portion and a high μ portion split along the longitudinal axis of the vehicle, the method further comprising increasing a pressure apply rate for a brake of each wheel travelling on the high μ portion of the road surface when a turning maneuver has been detected.

8. The method of claim 7 wherein isolation of the brake of each wheel travelling on the high mu portion of the road surface is delayed when a turning maneuver has been detected.

9. The method of claim 1 wherein the vehicle is travelling on a homogeneous road surface and a turning maneuver has been detected such that two of the vehicle wheels become more weighted and two of the vehicle wheels becomes more unweighted, the method further comprising increasing a pressure apply rate for a brake of each of the more weighted vehicle wheels.

10. The method of claim 1 wherein detecting a turning maneuver based on the comparison of the speed difference to the turning detection threshold and the decelerations to the deceleration threshold includes setting a turn flag false if the speed difference fails to exceed the turning detection threshold.

11. The method of claim 1 wherein detecting a turning maneuver based on the comparison of the speed difference to the turning detection threshold and the decelerations to the deceleration threshold includes setting a turn flag true if the speed difference exceeds the turning detection threshold and the decelerations of both wheels of the one pair of vehicle wheels whose speed was utilized to determine the speed difference fail to exceed the deceleration threshold.

12. A system for use with a vehicle including a pair of front wheels, a pair of rear wheels, and an anti-lock brake system (ABS), the system for detecting when the vehicle is executing a turning maneuver, the system comprising:
means for determining a speed difference between one pair of the vehicle wheels;
means for determining the deceleration of each wheel of the one pair of vehicle wheels whose speed was utilized to determine the speed difference;
means for comparing the speed difference to a turning detection threshold;
means for comparing the decelerations to a deceleration threshold; and
means for detecting a turning maneuver based on the comparison of the speed difference to the turning detection threshold and the decelerations to the deceleration threshold.

13. The system of claim 12 wherein the speed difference is determined based on the speeds of the front wheels when both pairs of the vehicle wheels are being driven and the vehicle includes a single speed sensor associated with the pair of rear wheels.

14. The system of claim 12 further comprising:
a counter, the counter being modified after comparing the wheel decelerations to the deceleration threshold; and
means for comparing the value of the counter to a hysteresis threshold;
wherein the means for detecting a turning maneuver does so based on the comparison of the counter to the hysteresis threshold.

15. The system of claim 12 wherein the comparisons to each of the thresholds are made only if the ABS is not activated.

16. The system of claim 12 wherein the vehicle is travelling on a road surface having at least a low μ portion and a high μ portion split along the longitudinal axis of the vehicle, the system further comprising means for increasing a pressure apply rate for a brake of each wheel travelling on the high μ portion of the road surface when a turning maneuver has been detected.

17. The system of claim 16 wherein isolation of the brake of each wheel travelling on the high mu portion of the road surface is delayed when a turning maneuver has been detected.

18. The system of claim 12 wherein the vehicle is travelling on a homogeneous road surface and a turning maneuver has been detected such that two of the vehicle wheels become more weighted and two of the vehicle wheels becomes more unweighted, the system further comprising means for increasing a pressure apply rate for a brake of each of the more weighted vehicle wheels.

19. The system of claim 12 wherein the speed difference is determined based on the speeds of the rear wheels when both pairs of the vehicle wheels are being driven, otherwise the speed difference being determined based on the speeds of the undriven pair of vehicle wheels.

20. The system of claim 12 wherein the means for detecting includes means for setting a turning maneuver based on the comparison of the speed difference to the turning detection threshold and the decelerations to the deceleration threshold includes means for setting a turn flag false if the deceleration of either wheel of the one pair of vehicle wheels whose speed was utilized to determine the speed difference exceeds the deceleration threshold.

21. The system of claim 12 wherein the means for detecting includes means for setting a turning maneuver based on the comparison of the speed difference to the turning detection threshold and the decelerations to the deceleration threshold includes means for setting a turn flag false if the speed difference fails to exceed the turning detection threshold.

22. The system of claim 12 wherein the means for detecting includes means for setting a turning maneuver based on the comparison of the speed difference to the turning detection threshold and the decelerations to the deceleration threshold includes means for setting a turn flag true if the speed difference exceeds the turning detection threshold and the decelerations of both wheels of the one pair of vehicle wheels whose speed was utilized to determine the speed difference fail to exceed the deceleration threshold.

23. A method for use with a vehicle including a pair of front wheels, a pair of rear wheels, and an anti-lock braking system (ABS), the method for detecting when the vehicle is executing a turning maneuver, the method comprising:
determining a speed difference between one pair of the vehicle wheels;
determining a lateral acceleration of the vehicle based on the speed difference between one pair of the vehicle wheels;

comparing the lateral acceleration to a turning detection threshold;

determining the deceleration of each wheel of the one pair of vehicle wheels whose speed was utilized to determine the speed difference;

comparing the decelerations to a deceleration threshold; and detecting a turning maneuver based on the comparison of the lateral acceleration to the turning detection threshold and the decelerations to the deceleration threshold.

24. The method of claim 23 further comprising detecting slip in the pair of rear wheels based on an average speed of the pair of rear wheels when a turning maneuver has been detected.

25. The method of claim 23 wherein the speed difference is determined based on the speeds of an undriven pair of vehicle wheels.

26. The method of claim 23 wherein detecting a turning maneuver based on the comparison of the lateral acceleration to the turning detection threshold and the decelerations to the deceleration threshold includes setting a turn flag true if the lateral acceleration exceeds the turning detection threshold and the decelerations of both wheels of the one pair of vehicle wheels whose speed was utilized to determine the speed difference fail to exceed the deceleration threshold.

27. The method of claim 26 wherein the turn flag is set true only if the ABS is not activated for the one pair of vehicle wheels whose speed was utilized to determine the speed difference.

28. The method of claim 26 wherein the turn flag is set false if the lateral acceleration fails to exceed the turning detection threshold and the ABS is not activated for the one pair of vehicle wheels whose speed was not utilized to determine the speed difference.

29. A system for use with a vehicle including a pair of front wheels, a pair of rear wheels, and an anti-lock braking system (ABS), the system for detecting when the vehicle is executing a turning maneuver, the system comprising:

means for determining a speed difference between one pair of the vehicle wheels;

means for determining a lateral acceleration of the vehicle based on the speed difference between one pair of the vehicle wheels;

means for comparing the lateral acceleration to a turning detection threshold;

means for determining the deceleration of each wheel of the one pair of vehicle wheels whose speed was utilized to determine the speed difference;

means for comparing the decelerations to a deceleration threshold; and means for detecting a turning maneuver based on the comparison of the lateral acceleration to the turning detection threshold and the decelerations to the deceleration threshold.

30. The system of claim 29 further comprising means for detecting slip in the pair of rear wheels based on an average speed of the pair of rear wheels when a turning maneuver has been detected.

31. The system of claim 29 wherein the speed difference is determined based on the speeds of an undriven pair of vehicle wheels.

32. The system of claim 29 wherein the means for detecting a turning maneuver based on the comparison of the lateral acceleration to the turning detection threshold and the decelerations to the deceleration threshold includes means for setting a turn flag true if the lateral acceleration exceeds the turning detection threshold and the decelerations of both wheels of the one pair of vehicle wheels whose speed was utilized to determine the speed difference fail to exceed the deceleration threshold.

33. The system of claim 32 wherein the turn flag is set true only if the ABS is not activated for the one pair of vehicle wheels whose speed was utilized to determine the speed difference.

34. The system of claim 32 wherein the turn flag is set false if the lateral acceleration fails to exceed the turn detection threshold and the ABS is not activated for the one pair of vehicle wheels whose speed was not utilized to determine the speed difference.

* * * * *